Patented Jan. 1, 1935

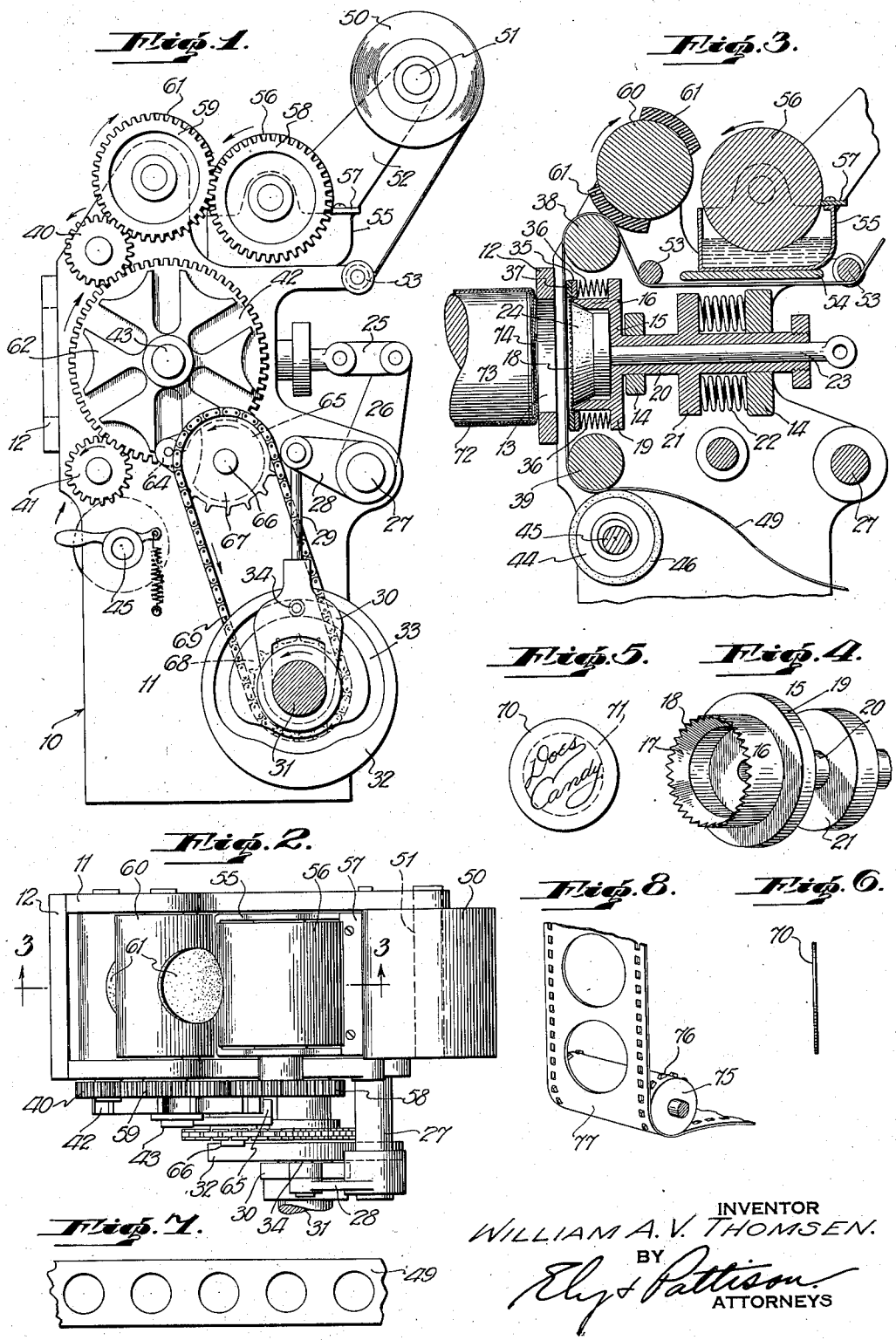

1,986,611

UNITED STATES PATENT OFFICE 1,986,611

AUTOMATIC LABELING AND/OR PACKAGE SEALING MACHINE

William A. V. Thomsen, Plainfield, N. J.

Application January 28, 1933, Serial No. 653,959

13 Claims. (Cl. 216—25)

This invention relates to improvements in automatic labelling and/or package sealing machines.

One of the important features of the invention resides in a machine for automatically cutting or punching labels or seals from a strip of material, and directly applying the same to a package to be labeled or sealed.

Another object of the invention is to provide a machine in which a strip of flexible material is intermittently moved past a cutting die, which die during each stopping of the strip operates to successively cut a seal or label therefrom and apply the same to a wrapper or package intended to receive the same.

A further object of the invention is the provision of a reciprocable unit which operates to successively grip a strip from which a seal or label is to be cut to hold the same taut, cut the seal or label from the strip while held taut, and eject the cut seal or label from the machine.

A still further object of the invention is to provide an automatic machine having the above features which is simple of construction, and rapid and positive in operation.

With these and other objects in view, the invention resides in the certain novel construction, combination and arrangement of parts, the essential features of which are hereinafter fully set forth in the specification, are particularly pointed out in the appended claims, and are illustrated in the accompanying drawing, in which:

Figure 1 is a side elevational view of a labeling machine constructed in accordance with my invention.

Figure 2 is a top plan view.

Figure 3 is an enlarged detail vertical sectional view on the line 3—3 of Figure 2.

Figure 4 is a detail perspective view of the cutter member.

Figure 5 is a plan view of one of the discs or labels cut by the machine.

Figure 6 is an edge elevation of the same.

Figure 7 is a fragmentary plan view of a portion of the strip of material from which the discs or labels are cut.

Figure 8 is a detail perspective view illustrating a modified form of strip feed.

Referring to the drawing by reference characters, the numeral 10 designates a supporting frame embodying suitable spaced vertical side plates 11—11, while bridging these plates at the front and adjacent the top of the same is a cross plate 12 having a round window opening 13 therein. Journaled in bearings 14—14 and disposed in alignment with the axis of the opening 13 is a cutter die member 15 which includes a hollow cylindrical cutting head 16 which is open at one end, and which end faces toward the plate 12. The head is of a diameter to freely pass into the opening 13 and the peripheral edge at the open side is beveled internally as at 17 to provide a sharp pointed cutting edge, and which cutting edge is preferably scalloped or of saw tooth configuration as at 18 to provide a sharp cut when in operation. The head 16 inwardly of the cutting edge is provided with an annular flange 19. Extending rearwardly from the head 16 is a tubular shaft or sleeve 20 which slides in the bearings 14 and provided on the tubular shaft and disposed intermediate the bearings 14—14 is an annular flange 21. Expansion springs 22 are interposed between the flange 21 and the rear bearing 14 which tends to normally urge the cutter unit in a forwardly cutting position.

Slidable within the tubular shaft 20 is a plunger rod 23 and carried by the front end thereof is a plunger head 24 which is normally housed within the hollow cylindrical cutter head 16. The rear end of the plunger rod extends beyond the tubular shaft 20 and has one end of a link 25 pivoted thereto, while the other end of the link is pivotally connected to an arm 26 fixedly mounted on a horizontal shaft 27 journaled at the rear of the side plates 11. Also fixed to the shaft 27 is a forwardly extending arm 28, the free end of which is pivotally connected to the upper end of a pitman 29. The lower end of the pitman is provided with a flat head 30 having an opening therein to loosely fit about a driven power shaft 31. The head fits against one side of a cam wheel 32 having a cam groove 33 therein for the reception of a pin 34 extending laterally from the head 30. The cam is so shaped that on each revolution thereof, the plunger rod 23 is given a single reciprocation, through the pitman 29, arm 28, shaft 27, arm 26 and link 25.

Freely encircling the cylindrical head 16 is a flat clamping ring 35 yieldingly supported by springs 36 fixedly connected to flange 19 of the said head. The front side of the ring carries a rubber cushion ring 37 which is normally held just beyond the plane of the cutting edge of the cutter head 16 and in a position in spaced relation to the inner adjacent face of the plate 12 when the plunger rod 23 is in retracted position.

Journaled respectively above and below the cutter head and in vertical alignment are rollers 38 and 39 having gears 40 and 41 respectively on one of the ends thereof meshing with an intermittently rotated driving gear 42 fixed to a shaft 43 journaled in the plates 11. Although both rollers 38 and 39 are rotatably driven, only the lower roller 39 constitutes a feed roller for feeding a strip past the window opening 13 as will be explained hereinafter.

Coacting with the feed roller 39 is an idler roller 44 freely mounted on an eccentric 44' which in turn is fixedly secured to a horizontal shaft 45 journaled in the plates 11, the outer periphery of the idler roller having a rubber friction ring 46 thereon. One end of the shaft 45 has a lever 47 fixedly mounted thereon while a contractile spring 48 has one end fixed thereto and its other end to the adjacent side plate 11. The tension of the spring serves to turn the shaft and resiliently hold the idler roller 44 against the feed roller 39. Manual actuation of the lever 47 against the action of the spring will of course turn the shaft and eccentric 44' and move the idler roller away from the feed roller 39 to enable the threading of the flexible strip of stock 49 therebetween.

The strip of stock 49 is preferably stiff flexible blank or printed paper and is unwound from a roll 50 removably supported upon a spindle 51 carried by an upstanding bracket arm 52 secured to or formed integral with one of the side plates 11. The strip 49 after leaving the roll passes beneath a pair of spaced horizontally alined guide rollers 53 journaled in the side plates adjacent the top thereof. The strip after passing beneath the rollers 53, passes over the roller 38 and thence downwardly between the plate 12 and cutting die, after which it passes between the feed roller 39 and eccentric roller 45.

Supported upon a platform 54 extending between the side plates 11, is an adhesive pot 55 and journaled in bearings at opposite ends of the said adhesive pot is a driven rotatable adhesive pick up roller 56. A scraper blade 57 is mounted upon the adhesive pot for scraping excess adhesive picked up by the roller during its rotation. One end of the pick up roller is provided with a gear 58 which is in constant mesh with a gear 59 fixedly secured to one end of an adhesive transfer or dauber roller 60. The roller 60 is journaled in the side plates 11, and the gear 59 thereof obtains its power by meshing with the gear 40. The transfer roller is provided with oppositely disposed yieldable dauber disks 61 preferably constructed of sponge rubber. The dauber disks pick up adhesive by alternate contact with the pick up roller 56 and apply round areas of adhesive along the strip 49 prior to the passage of the strip past the window opening 13.

In order to intermittently feed the strip 49 past the window opening 13 I employ a Geneva movement which obtains its power from the drive or power shaft 31. The Geneva mechanism comprises a Geneva wheel 62 fixedly carried by the shaft 43 and disposed outside of the gear 42. The Geneva wheel is formed with the radially disposed slots 63 opening onto the outer edge thereof and successively receivable in the slots is a roller 64 carried by an arm 65 fixed to a rotatable shaft 66, where upon each revolution of the shaft, the roller imparts a predetermined rotary movement to the Geneva wheel 62 which is in turn imparted to the shaft 43 and gear 42. Power is transmitted to the shaft 66 from the power shaft 31 in the following manner.

A sprocket wheel 67 is fixed to the shaft 66 while a sprocket wheel 68 is fixed to the power shaft 31 between the cam wheel 32 and the adjacent side plate 11. An endless sprocket chain 69 passes over the sprockets 67 and 68. From the description just set forth, it will be seen that the Geneva mechanism receives its power from the power drive shaft, and it in turn transmits an intermittent movement to the strip feeding rollers, adhesive pick up roller and adhesive transfer or dauber roller, and which operates in timed accord with the cutting and punching mechanism.

In operation, assume that it is desired to punch labels or seals such as shown in Figure 5 by the numeral 70 from the strip 49. The tape is threaded into the machine in the manner described and shown in Figure 3, the cutting die and punch being in a retracted position. As the strip is intermittently fed from the roller, it first receives equidistantly shaped dabs of adhesive 71 by contact of the dauber pads 61 with the upper side of the strip, the roller 38 acting as a bearing roller during the application of the adhesive to the strip. After passing over the roller 38, the adhesive side of the strip is presented to the front of the machine and the adhesive area being smaller than the opening 13, the same is brought into axial alignment therewith without contacting with the rear side of the front plate 12 within the path of the cutter member 15. When the adhesive area is in alignment with the window opening the feed mechanism is at a stand still, and at this time, the cam wheel 32 operates the pitman 29 to cause a forward movement to be imparted to the plunger 23. The springs 22 acting upon the cutter member 15, will cause the forward advance of the said member, the cutting edge 17 of which is in advance of the plunger until such time as the cutter has performed its cutting function. The forward movement of the cutter member causes the cushioned clamping ring 35 to press the adjacent portion of the strip against the rear of the front plate 12, thus holding that portion of the strip in registration with the window opening in a taut condition. As the cutter member continues to move forward, the teeth 18 pass through the strip and cut the disk seal or label 7—, and which cutting operation is immediately followed by the continued forward movement of the plunger head 24. After the cutter member has been moved by the springs 32 to the limit of its cutting movement, the energy of the springs is spent and the plunger head moves forward relative to the cutter member and ejects the label or seal 70 through the opening 13. After a cutting and ejecting operation, the cam wheel and its co-related parts returns the plunger member to a retracted position, and the plunger in turn retracts the cutter member against the action of the spring 22. When the cutter member and plunger are clear of the path of the strip, the Geneva movement again functions to feed another adhesive coated area into position with respect to the window opening, at which time the cutter and plunger operate as before explained.

In another invention, for which I am about to make application, I produce a tubular "Cellophane" bag in which the bottom is closed by the inward folding of one of the ends, and by presenting these folded ends to the window opening 13, the label 70 can be directly applied thereto, to secure the folded portions and seal the bag bottom. In Figure 3, I have illustrated this feature wherein 72 designates a portion of a bag formed upon a mandrel 73, one of the ends of the bag being folded inwardly as at 74 to close the same. Thus by presenting this folded end to the window opening 13, the plunger 24 during its forward extended movement will press the label with the adhesive side against the folds 74 of the bag.

It may be desirable when punching printed labels from a strip to have a more positive feed than the friction feed produced by the rollers 39 and 45. In Figure 8 of the drawing I have illustrated a roller 75 which may be substituted for the roller 39, the same having radially extending teeth 76 adjacent opposite ends thereof. The label strip 77 is provided with rows of spaced slots 78 parallel to and adjacent the longitudinal edges thereof, the teeth passing through the slots and serving to exert a positive pull upon the strip without possible slippage. This will assure absolute registration of each printed area with the window opening 13.

Although I have shown a cutting die for cutting round or circular seals or labels, other shapes may be cut by changing the shape of the die.

While I have shown and described what I deem to be the preferred embodiments of my invention, I wish it to be understood that such changes as come within the scope of the appended claims may be resorted to if desired.

Having thus described the invention, what I claim as new and desire to secure by Letters Patent of the United States, is:—

1. In a machine of the class described, means for supporting a flexible strip, a reciprocable cutter member, means for intermittently feeding said strip in the path of reciprocable movement of said cutter member, means for reciprocating said cutter member while said strip is stationary, and ejector means separate from said cutter and operable with respect thereto for ejecting the cut portions of said strip therefrom.

2. In a machine of the class described, a reciprocable cutter member, means for moving a flexible strip in the path of reciprocable movement of said cutter member, means for intermittently moving said flexible strip, releasable means for holding that portion of said strip presented to said cutter member in a taut condition between movements thereof, and means for reciprocating said cutter member while said strip is stationary.

3. In a machine of the class described, a fixed plate having an opening therein, means for supporting a flexible strip, means for intermittently feeding said strip past said opening, releasable means for clamping said strip against said plate to hold the same taut across said opening upon each stopping of the strip during its intermittent movement, a reciprocable cutter member in alignment with said opening, and means for reciprocating said cutter member during each stopping of said strip to cut that portion of said strip in registration with said opening.

4. In a machine of the class described, a fixed plate having an opening therein, means for supporting a flexible strip, means for intermittently feeding said strip past said opening, releasable means for clamping said strip against said plate to hold the same taut across said opening upon each stopping of the strip during its intermittent movement, a reciprocable cutter member in alignment with said opening, means for reciprocating said cutter member during each stopping of said strip to cut that portion of said strip in registration with said opening, and punch means extending beyond the cutter member when at the limit of its cutting movement for ejecting the cut portions of said strip through said opening.

5. In a machine of the class described, a fixed plate having an opening therein, means for intermittently moving a flexible strip past said opening, a hollow cutter member slidably mounted in alignment with said opening and movable thereinto, a slidable ejector member housed within said hollow cutter member but movable therebeyond, and means for reciprocating said cutter member and ejector member to successively cut that portion of said strip in register with said opening and eject the cut portion therethrough.

6. In a machine of the class described, a fixed plate having an opening therein, a reciprocable cutter member in alignment with said opening, means for supporting a flexible strip, intermittent means for feeding said strip between said fixed plate and said cutter member, yieldable clamping means carried by said cutter member in advance of the cutting edge thereof to clamp said strip against said plate to hold the same taut across said opening, and means for reciprocating said cutter member.

7. In a machine of the class described, a slidable plunger rod, a head on one end of said plunger rod, a tubular shaft slidably mounted on said plunger rod, a recessed cutter head on one end of said tubular shaft, spring means acting upon said cutter head to normally hold the same against said plunger head in telescoping relation thereto, means for reciprocating said plunger rod and head, said head moving beyond the plane of the cutting edge of said cutter head when at the limit of its forward extended position, and intermittently operated strip feeding means adapted to feed a strip to be cut and punched in the path of forward movement of said cutter member and plunger head.

8. In a machine of the class described, means for supporting a flexible strip having equidistantly spaced adhesive coated areas on one side thereof, a hollow reciprocable cutter member, means for intermittently feeding said strip in the path of reciprocable movement of said cutter member to successively move the adhesive coated areas in axial alinement therewith, the cutter member being of a size to cut beyond the coated areas, a reciprocable punch member normally housed within said hollow cutter member, means for reciprocating said punch member to extend the same beyond said cutter member when said cutter member is at the limit of its cutting movement, and spring means for sliding said cutter member in the direction of its cutting movement, said cutter member being moved in an opposite direction against the action of said spring means by said punch member upon the return movement thereof.

9. In a machine of the class described, means for supporting a flexible strip to be cut and punched out at spaced distances therealong, a recessed reciprocable cutter member, a reciprocable punch member normally disposed within said recessed cutter member, means for simultaneously reciprocating said cutter member and said punch member, means for moving said punch member beyond the cutter member after the cutter member has reached the limit of its movement in a cutting direction, and means for intermittently feeding the flexible strip in the path of said cutter member in timed relation to the reciprocating movement thereof.

10. In a machine of the class described, a fixed plate having an opening therein, means for supporting a flexible strip, means for intermittently moving said strip past said opening adjacent one side of said plate, a reciprocable cutter member in alinement with said opening, a clamping member yieldably supported by said cutter member and normally disposed on a plane in advance of the cutting edge of said cutter member, and means for reciprocating said cutter member during each stopping of said strip to cause said clamping member to move toward said plate in one direction of its movement and coact therewith to hold said strip taut across said opening and to successively cause said cutter member to cut through said strip, and to return said cutter member and release said strip upon movement of the cutter member in an opposite direction.

11. In a machine of the class described, a fixed plate having an opening therein, means for supporting a flexible strip, means for intermittently moving said strip past said opening adjacent one side of said plate, a reciprocable cutter member in alinement with said opening, a clamping member yieldably supported by said cutter member and normally disposed on a plane in advance of the cutting edge of said cutter member, and means for reciprocating said cutter member during each stopping of said strip to cause said clamping member to move toward said plate in one direction of its movement and coact therewith to hold said strip taut across said opening and to successively cause said cutter member to cut through said strip, and to return said cutter member and release said strip upon movement of the cutter member in an opposite direction, and punch means operable for ejecting the cut portion of said strip through said opening upon the completion of the movement of said cutter member in a cutting direction.

12. In a machine of the class described, a reciprocable cutter member having a recess therein, a reciprocable punch member normally housed within the recess of said recessed cutter member, means for simultaneously reciprocating said cutter member and said punch member, and means for extending said punch member beyond said cutter member when said cutter member reaches the limit of its movement in a cutting direction.

13. A machine of the class described including a frame having a vertical plate provided with an opening, feed rollers journaled in said frame above and below said opening and adapted to feed a strip to be perforated vertically adjacent one side of said plate and past said opening, means for intermittently rotating said feed rollers in the same direction of rotation, a reciprocable cutter member in alinement with said opening, a clamping element resiliently mounted on said cutter member in advance of the cutting edge of the same and in the plane of said plate, and means for reciprocating said cutter member between the intermittent operations of said feed rollers.

WILLIAM A. V. THOMSEN.